United States Patent [19]

Izumita et al.

[11] Patent Number: 4,661,956
[45] Date of Patent: Apr. 28, 1987

[54] METHOD OF CORRECTING ERRORS OF DIGITAL SIGNALS IN THE RECORDING AND REPRODUCTION OF DIGITAL SIGNALS

[75] Inventors: Morishi Izumita, Inagi; Seiichi Mita, Tsukui; Masuo Umemoto, Nishitama; Hidehiro Kanada, Kodaira; Morito Rokuda, Katsuta, all of Japan

[73] Assignees: Hitachi, Ltd.; Hitachi Denshi Kabushiki Kaisha, both of Tokyo, Japan

[21] Appl. No.: 703,917

[22] Filed: Feb. 21, 1985

[30] Foreign Application Priority Data

Mar. 2, 1984 [JP] Japan .................................. 59-39769

[51] Int. Cl.⁴ ............................................. G06F 11/10
[52] U.S. Cl. ........................................ 371/38; 371/50; 371/39
[58] Field of Search ....................... 371/37, 38, 40, 49, 371/50, 51, 39

[56] References Cited

U.S. PATENT DOCUMENTS 4,044,328  8/1977  Herff ..................................... 371/50
4,314,369  2/1982  Caillet ................................... 371/69
4,334,309  6/1982  Bannon ................................. 371/38
4,369,512  1/1983  Brossard ............................... 371/43
4,486,881 12/1984  de Couasnon ....................... 371/38
4,549,298 10/1985  Creed ................................. 371/38 X Primary Examiner—Jerry Smith
Assistant Examiner—Robert W. Beausolid, Jr.
Attorney, Agent, or Firm—Antonelli, Terry & Wands

[57] ABSTRACT

Parity bits (check bits) having a relatively high redundancy are added to upper significant bits of a digital signal, and parity bits having a relatively low redundancy, are added to the lower significant bits of the digital signal. The signal and the parity bits are recorded on a recording medium. The position of an error in a data block group of the lower bits reproduced from the recording medium is estimated as existing in a block in which the error is detected by the check of the data block group of the upper bits, and in the blocks preceding and subsequent to the former.

This error correction method is most suitable for a recording and reproduction system of digital video signals.

12 Claims, 10 Drawing Figures

FIG. 3A

| | UP1 | TU22 | UP2 | | UP3 | TU23 | UP4 |
|---|---|---|---|---|---|---|---|
| UD11 | | UD12 | | UD13 | | UD14 | |
| UD21 | | //UD22// | | //UD23// | | UD24 | |
| UD31 | | ... | | ... | | ... | |
| . | | | | | | | |
| . | | | | | | | |
| . | | | | | | | |
| . | | | | | | | |
| . | | | | | | | |
| UQ1 | | UQ2 | | UQ3 | | UQ4 | |

FIG. 3B

| TL21 | LP1 | TL22 | LP2 | | LP3 | TL23 | LP4 | TL24 |
|---|---|---|---|---|---|---|---|---|
| LD11 | | LD12 | | LD13 | | LD14 | | |
| LD21 | | LD22 | | LD23 | | LD24 | | |
| LD31 | | ... | | ... | | ... | | |
| . | | | | | | | | |
| . | | | | | | | | |
| . | | | | | | | | |
| . | | | | | | | | |
| . | | | | | | | | |
| LQ1 | | LQ2 | | LQ3 | | LQ4 | | |

METHOD OF CORRECTING ERRORS OF DIGITAL SIGNALS IN THE RECORDING AND REPRODUCTION OF DIGITAL SIGNALS

This invention relates to a method of correcting digital signals, and more particularly to a method of adding an error-correcting code and correcting an error particularly when a video or audio signal is digitized, and is recorded on a magnetic tape or a magnetic disk and is reproduced therefrom.

When a video signal is digitized, and then is recorded on a magnetic medium such as a magnetic tape or a magnetic disk and is thereafter reproduced, the reproduced signal will be adversely affected and the adversely affected region will produce a digital code error if dust lies on the medium or if dropout occurs. If such a digital code error occurs, the quality of the reproduced picture will deteriorate.

Generally, digital code errors can be classified into two kinds. One is referred to as "random error", which is an error of one bit at an arbitrary position, while the other is referred to as "burst error" in which a multiple-bit error is concentrated in one sector.

An error-correcting code having high correcting ability particularly for burst error has been employed in the past in magnetic recording apparatuses such as magnetic tape recorders or the like.

FIG. 1 illustrates the arrangement of data and parity in the conventional error-correcting method.

In FIG. 1, reference numerals D1–D128, D129–D256, . . . , D897–D1024 represent the data blocks for each row. One data item is one bit in this drawing, but may be one word. Reference numerals P1–P16, P17–P32, . . . , P113–P128 represent the parity blocks for horizontal rows, and Q1–Q128 represent the parity blocks for vertical columns. That is, the vertical parity Q1 is the parity for D1, D129, . . . , D897. These parity bits may be simple (even or odd) parity, or a cyclic code having high burst error detecting ability such as a cyclic redundancy check code (CRCC) may be used.

Data recording and reproduction is carried out sequentially, first for the data blocks D1–D128, P1–P16 in the horizontal direction, then for D129–D256, P17–P32, and finally for Q1–Q128, P129–P144.

When the construction shown in FIG. 1 is employed, a burst error of up to 128 bits can be corrected. If, for example, the burst error occurs at D1–D128, the parity for P1–P16 and Q1–Q128 is not zero, so that the error is corrected by estimating that the error has occurred at D1–D128. When CRCC is used as the error correcting code, for example, the input data P is multiplied by the term of the highest order of a generator polynomial G determined in advance in order to obtain P', the product P' is then divided by G to obtain the remainder, and this remainder is added to P' as the check bits and is recorded. When a reproduced signal is checked, (P'+remainder) is divided by G, and the signal is judged as being "no error" if (P'+remainder) is divisible by G and as being an "error" if it is not. In order to make a correction, the bits of an indivisible horizontal row and the bits of a vertical column which are not zero may be inverted. The column which is not zero may be inverted.

Though the construction shown in FIG. 1 is suitable for correcting a burst error as described above, it involves a problem in that it is not very effective for correcting random errors. If, for example, random errors occur at three positions of D1,D2 and D129 in FIG. 1, the errors can not be corrected by using only parities P and Q. To improve error detection and correction capability, the bit number of the parities P and Q may be increased, but the increased redundancy increases the data rate.

It is therefore an object of the present invention to provide an error correction method which can solve the problems of the prior art described above, and can correct errors without increasing the number of parity bits even when a random error and a burst error occur simultaneously.

This object can be accomplished by the present invention which provides an error correction method comprising the steps of:
adding parity bits of a relatively high redundancy to the upper significant bits of a digital data signal and parity bits having a relatively low redundancy to the lower significant bits of the digital data signal;
recording the upper and lower significant bits together with their parity bits on a recording medium;
reproducing the signals corresponding to the data bits and their parity bits from the recording medium, and dividing the reproduced signals into a group including the upper significant bits and their parity bits and a group including the lower significant bits and their parity bits;
detecting the error position in the upper significant bit group on the basis of the parity bits of the upper significant bit and correcting the error;
estimating the occurrence region of the error in the lower significant bits on the basis of the error position detected in the upper significant bit group; and
correcting the error in the lower significant bit group on the basis of the result of estimation and of the parity bits of the lower significant bits.

In the accompanying drawings

FIGS. 3A and 3B are diagrams showing error correcting codes in an embodiment of the invention;

FIG. 2 is a diagram which is useful for explaining the principle of the present invention, and shows the envelope of a reproduction waveform when dropout occurs.

The present invention improves the error correcting ability without increasing the parity bits by utilizing the properties of the picture and the correlation between the errors.

First of all, the properties of the picture will be explained briefly. When an ordinary video signal is digitized, a sampling frequency at which the video signal is sampled for quantization is chosen as approximately 10

MHz and the number of quantization bits is chosen as eight bits. When a feedback type A/D converter is used as an A/D converter for digitizing a video signal, the digital signal of the input of a D/A converter represents the code corresponding to the magnitude of an input voltage to be converted, after the output voltage of the D/A converter is compared with the input voltage to be converted and is then adjusted so that they coincide with each other. This code is one that has a certain weight for each column such as 128, 64, 32, 16, 8, 4, 2 and 1 of a natural binary code, and the sum of each column represents a numeric value. The respective weights are added to the eight quantization bits ranging from the most significant bit (MSB) to the least significant bit (LSB).

A conventional error correcting system deals with these 8 bits as being equivalent to one another. Therefore, the same correction processing is carried out even when the most significant bit (MSB) of the 8 bits is wrong and when the least significant bit (LSB) is wrong. This means that the LSB as well as the MSB can not be reproduced not only when the state of reproduction is bad and errors occur in many cases in the MSB but also when they occur in many cases in the LSB.

In the case of a video signal, however, the error of the MSB is visibly quite different from the error of the LSB. Though the MSB error proves to be a significant error in terms of the reproduced picture quality, the LSB can hardly be detected visibly. In other words, the MSB error is so great an error that the levels above and below a line halving (voltage) level axis of a video signal are inverted, and the error of the second bit becomes an error within one of the two level regions formed by halving the level of the video signal. Thus, the range of each video signal on the level that becomes an error, becomes sequentially narrower and narrower until finally it can be virtually disregarded in the LSB. This is particularly so with random errors.

Therefore, it is possible, in principle, to limit the error correction to the upper significant bits (e.g., upper 4 bits). But if the lower significant bits are not corrected, picture quality will be adversely affected when copying the picture. Particularly when a burst error occurs, the picture quality will be significantly reduced. For this reason, the error correcting ability for a part of a random error and a burst error must be secured also for the lower significant bits.

Figure 1:
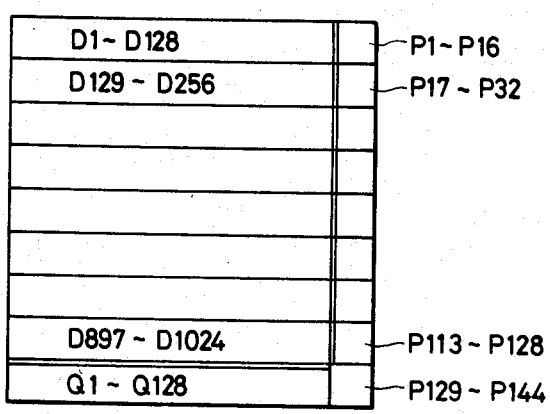
FIG. 1 is a diagram showing the disposition of data and parity in a conventional error correction method.
Figure 2A:
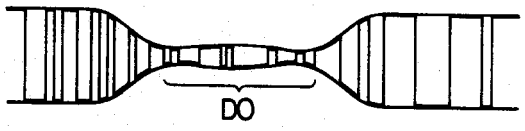
FIGS. 2A, 2B and 2C are diagrams useful for explaining the principle of the present invention and showing reproduction waveforms.
Figure 2B:
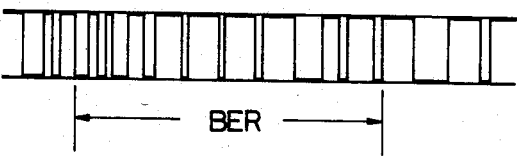
Figure 2C:
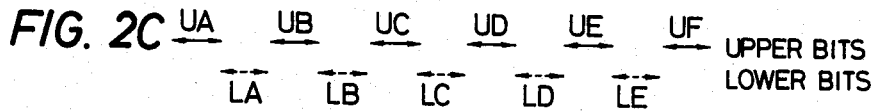

Next, the properties of a burst error will be described. If the level of a reproduction waveform is reduced due to dropout (DO) or scratched tape as shown in FIG. 2A, errors frequently occur near the dropping level, and the portion of the reproduced data represented by symbol BER in FIG. 2 is the burst error. FIG. 2C shows an example of the data construction, where UA, UB, UC, UD, UE and UF represent the upper four bits and LA, LB, LC, LD and LE represent the lower four bits. It will be assumed that the burst error for the upper significant bits is determined to be within the period of UB-UE by parity check. Then it is possible to estimate that the burst error for the lower significant bits is within the period of LA-LE bounded by the preceding bit LA and subsequent bit LE. This means that if the burst error detecting ability for the upper significant bits is provided, the area of the burst error for the lower significant bits can be estimated from the properties of the burst error.

The present invention performs error correction by utilizing the two properties described above (that is, the difference of the MSB error from the LSB error in the case of the picture, and the property that the area of the burst error for the lower significant bits can be estimated from the burst error area for the upper significant bits). More definitely, the error correcting ability of the random error is enhanced for the upper significant bits, and the error correcting ability of both upper and lower significant bits is provided for a burst error. In regard to the detection of a burst error in this case, detection ability is enhanced primarily for the upper significant bits, and the area of the burst error for the lower significant bits is estimated from the detection signal.

FIGS. 3A and 3B show the construction of error correcting codes in accordance with an embodiment of the present invention. FIG. 3A shows the code construction for the upper four bits, and FIG. 3B does the code construction for the lower four bits.

Recording and reproduction of data are sequentially carried out for the upper four bits, the lower four bits, the upper four bits, the lower four bits, . . . , in the horizontal direction, in the order named. That is, the horizontal row parity bits are added alternately to the upper four bits and to the lower four bits in the sequence of the horizontal row parity bits UP1 to the data block UD11 of the upper four bits in FIG. 3A, then the horizontal row parity bits LP1 to the data block LD11 of the lower four bits in FIG. 3B, the horizontal row parity bits UP2 to the data block UD12 of the upper four bits, the horizontal row parity bits LP2 to the data block LD12 of the lower four bits, and so forth. Finally, the vertical column parity bits UQ1, LQ1, UQ2, LQ2, . . . are added sequentially to the data blocks in the vertical direction.

A random error correction and byte error detection code (described, for example, in the literature listed below) is used for the horizontal row parity:

"A Class of SEC-DED-SbED Code Detecting Byte Error with Parity Check:", by Shigeo KANEDA, bulletin of Electrocommunication Society, EC81-44.

This code can correct an arbitrary one bit, and can detect random 2-bit error and error by each b-digits. That is, it can correct 1-bit error and can detect the errors more than 1-bit as a burst error. The error data thus detected is used as a pointer for the vertical column parity UQ1, UQ2 . . . , that will be described next. The vertical column parity is a code that has erasure correcting ability with a pointer. (The term "erasure" represents the state in which the symbol ("0" and "1" in the binary code) can not be determined.) It is preferably, for example, a b-adjacent code which can correct erasure by each b-digits (See, for example, "Modularized b-Adjacent Error Correction" by Eiji FUJIWARA, bulletin of Electrocommunication Society, EC76-19).

A parity having only error detecting ability and low redundancy such as a simple parity is used as the horizontal row parity LP1, LP2, . . . for the lower four bits in FIG. 3B. A code having erasure correcting ability is used as the vertical column parity LQ1, LQ2, . . . for the lower four bits in the same way as the upper significant bits.

The error correction at the time of reproduction of a signal is carried out in the following sequence. One-bit error is corrected by utilizing the horizontal row parity for the upper four bits, and the pointer TU is generated for the errors of more than 1-bit. In FIG. 3A, the pointers TU are generated at the positions of the horizontal row parities UP, respectively. Also, in FIG. 3B, the pointers TL are generated at the positions of the horizontal row parities LP, respectively. Generating the pointers TU and TL means that a binary 1 is generated at and added to each of the positions of the horizontal row parities, for example, indicated by the symbols TU 22 and 23, and TL 21 through 24 in FIGS. 3A and 3B. In the case that the pointer is not generated, a binary 0 is generated at and added to each of the positions of the horizontal row parities. In FIG. 3, the range represented by a frame of oblique lines represents, for example, a range in which the occurrence of a burst error is detected. When the occurrence of the burst errors in the blocks of the upper significant bits UD22, UD23 is detected, the pointers TU22, TU23 are first added to the positions of UP2, UP3, and at the same time, estimation is made that burst errors have occurred also in the blocks LD22, LD23 of the lower significant bits. In conjunction with the blocks of the lower significant bits, there is the possibility that burst errors also occur in the blocks LD21 and LD24 preceding and subsequent to the error blocks LD22 and LD23. Therefore, the pointers TL21, TL22, TL23, TL24 are added. This processing is referred to as "error area expansion". A similar pointer TL is added to the block for which the error is detected by the horizontal row parity LP of the lower significant bits.

One-bit random error of the upper significant bits is corrected by the horizontal parity UP described above. Erasure correction is made for the errors more than 1-bit, that is, burst errors and random errors, by means of the pointers TU, TL and the vertical parity UQ, LQ.

Figure 4:
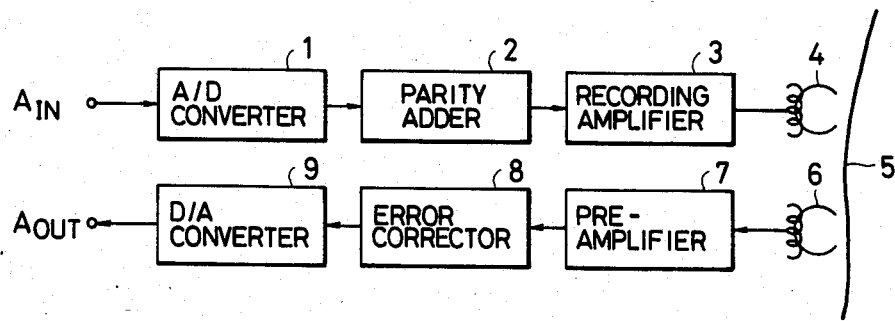
FIG. 4 is a block diagram of a digital signal recording/reproducing system using the present invention.

FIG. 4 is a block diagram of a digital signal recording-reproduction circuit using the present invention.

An analog input signal $A_{IN}$ is converted to a digital signal by an analog-digital converter 1. This data is applied to an error correction parity bits adding circuit (parity adder) 2, is passed further through a recording amplifier 3 and is thereafter recorded on a magnetic tape 5 by a magnetic head 4. In the reproducing mode, the signal on the magnetic tape 5 is read by a magnetic head 6, is amplified by a preamplifier 7 to form a binary level, and is applied to an error correcting circuit 8 so that the random error of the upper significant bits can be corrected and erasure correction of the burst error and the random error of the lower significant bits can be made. After correction, the signal is converted to the original analog signal $A_{OUT}$ by a digital-analog converter 9 and is produced therefrom.

Figure 5:
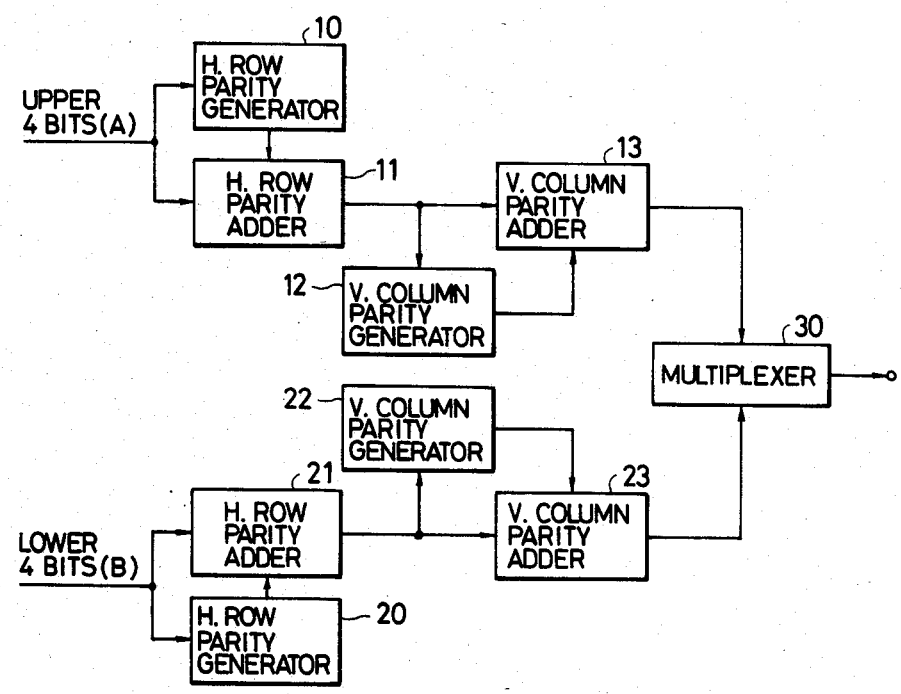
FIG. 5 is a block diagram showing an example of a parity addition circuit in the recording system shown in FIG. 4.

FIG. 5 is a block diagram showing an example of the parity adding circuit of the recording system shown in FIG. 4. The upper four bits and the lower four bits are separately applied to horizontal row parity generating circuits, (generators) 10 and 20, respectively, so as to generate the horizontal parity bits UP and LP. These parity bits UP, LP are added to the respective original data, that is, the upper four bits and the lower four bits, by horizontal row parity adding circuits (adders) 11 and 21, and are then applied to vertical column parity generating circuits (generators) 12 and 22. The vertical column parity bits UQ and LQ thus formed are added to the respective original data by vertical column parity adding circuits (adders) 13 and 23. Next, the upper four bits with parity bits and the lower four bits with parity bits are delivered altermately out of a multiplexer 30. The data that have thus been re-arranged are recorded on a recording medium such as a magnetic tape or a magnetic disk.

Figure 6:
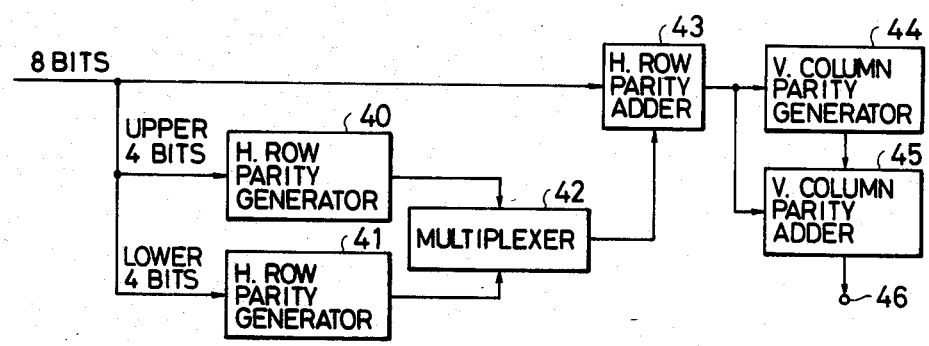
FIG. 6 is a block diagram of the parity addition circuit showing another embodiment of the invention.

FIG. 6 is a block diagram of a parity adding circuit in accordance with another embodiment of the invention.

In FIG. 5, the upper four bits and the lower four bits are processed entirely separately and the horizontal row parity bits and the vertical column parity bits are added, respectively, whereas in FIG. 6, the vertical column parity bits are generated by the same circuit and are added to the upper and lower significant bits, though the horizontal row parity bits are separately added to the upper four bits and to the lower four bits. In FIG. 6, the upper four bits and lower four bits of 8-bit picture data are applied respectively to horizontal row parity generators 40 and 41 to generate the horizontal row parity bits UP and LP. They are then composed by a multiplexer 42. The resulting composite horizontal row parity bits UP, LP are added to the original 8-bit data by a horizontal row parity adding circuit 43. The 8-bit data and the horizontal row parity bits thus added are then applied to a vertical column parity generator 44 to generate vertical column parity bits UQ, LQ, and the resulting parity bits are added to the 8-bit data and to the horizontal row parity bits by a vertical column parity adder 45 and are produced from a terminal 46.

Figure 7:
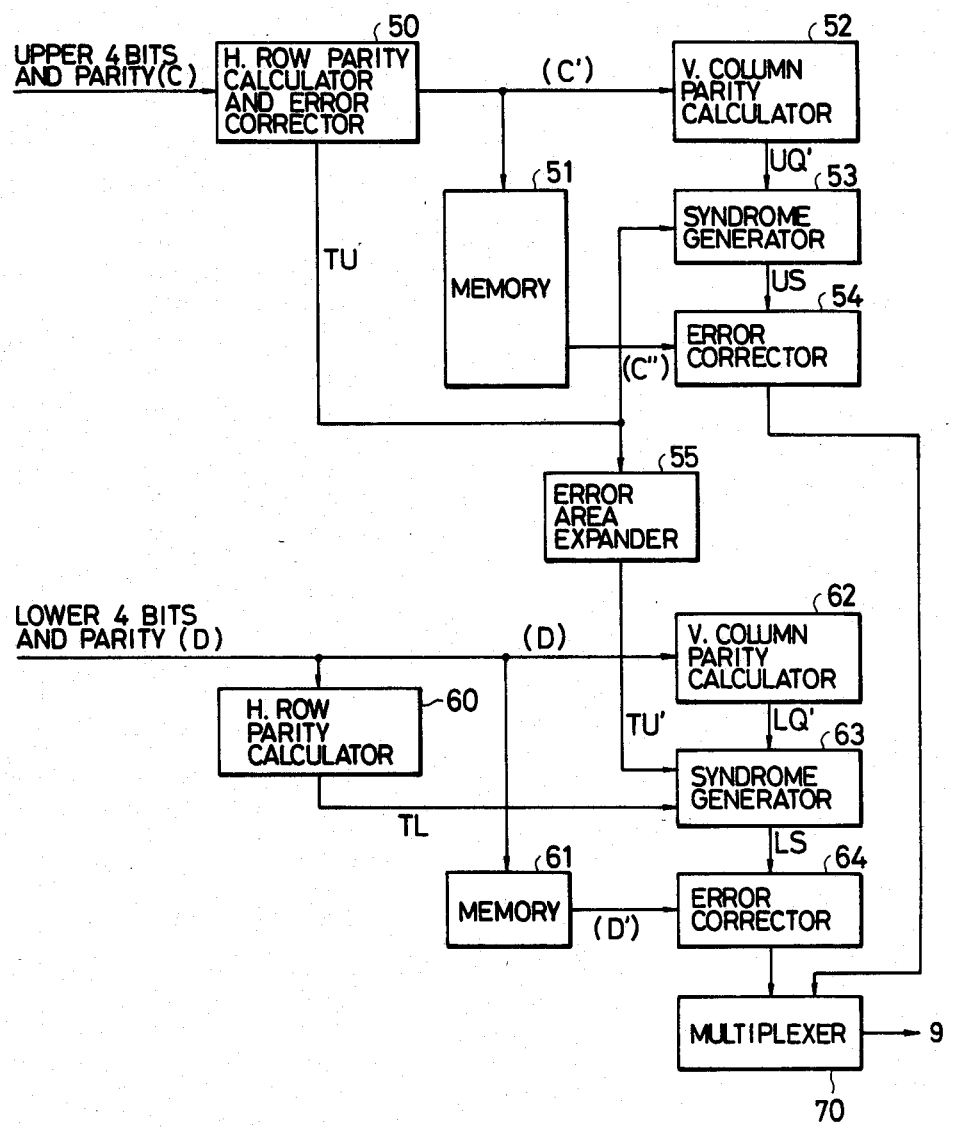
FIG. 7 is a block diagram showing an example of an error correction circuit of the reproducing system shown in FIG. 4.

FIG. 7 is a block diagram showing one example of an error correcting circuit of the reproduction system shown in FIG. 4.

The signal read by the magnetic head is passed through a preamplifier, and is separated into the upper four bits with their parity bits and the lower four bits with their parity bits, which are applied to the upper and lower bit input terminals of the error correcting circuit shown in FIG. 7.

Detection and correction of one-bit data are made by applying the upper four-bit data and their parity bits (C) to a horizontal row parity calculating and error correcting circuit 50, and the data (C') after correction are stored in a memory 51 and are also applied to a vertical column prity calculating circuit 52. When errors of more than one bit are detected by the horizontal row parity calculating and error correcting circuit 50, the pointer TU is delivered to a syndrome generating circuit 53 and also to an error area expanding circuit 55. The vertical column parity calculating circuit 52 calculates the vertical column parity for the data (C') after correction, and delivers a final output UQ' to the syndrome generating circuit 53. The syndrome calculating circuit 53 calculates the error position and the error pattern on the basis of the final output UQ of the vertical column parity calculating circuit 52 and the data of the pointer TU, and applies the correcting data US to an error correcting circuit 54. The error correcting circuit 54 consists of a circuit which produces exclusive-or between the data (C") delayed by the memory 51 and the correcting data US corresponding to the data (C"), that is, the error pattern. This arrangement makes it possible to correct the errors in the upper four bit data.

Next, the horizontal row parity calculator 60 calculates whether or not the error occurs, by applying the lower four bits data and their parity bits (D) to the horizontal row parity calculator 60. When an error occurs, the pointer TL is applied to the syndrome generator 63. As the pointer TU detected by the horizontal parity calculator and error corrector 50 for the upper four bits is applied to the error area expander 55, the area expander 55 produces the pointer TU' of the area including the bits preceding and subsequent to the position of occurrence of the burst error to the syndrome generator 63. In the case of the example shown in FIGS. 3A and 3B, the area expander 55 sets a binary 1 at TL 22 and sets binary 1s at TL 21 and TL 23 preceding and subsequent to TL 22, respectively, in response to the binary 1 at the pointer TU 22. At the same time, in response to the binary 1 at the pointer TU 23, the area expander 55 sets binary 1s at TL 22, 23, and 24, respectively. Furthermore, data in the lower four bits and their parity bits (D) are stored in a memory 61 and are applied to the vertical column parity calculator 62. This calculator 62 calculates the vertical parity LQ' on the basis of data in the lower four bits and their parity bits (D) and provides its output to the syndrome generator 63. The syndrome generator 63 calculates the error position and the error pattern from the data of vertical parity LQ' and the pointers TU' and TL indicating the error position, and produces correcting data LS to the error corrector 64. This corrector 64 corrects the data (D') delayed by the memory 61 by means of the correcting data LS corresponding thereto.

The data after correction of the upper four bits and the data after correction of the lower four bits are composed by a multiplexer 70, and the resulting 8-bit composite data is applied to the digital-analog convertor 9 shown in FIG. 4.

As described above, this embodiment can improve random error correcting ability for the upper significant bits by changing the ratio of the parity bits to be added to the upper four bits and to the lower four bits. In conjunction with burst errors, the error area is estimated from the burst error detected by the parity for the upper significant bits, and by so doing, the burst error can also be corrected. Therefore, even when a random error and a burst error coexist, error correction can be made efficiently. The probability of occurrence of an uncorrectable error is high for the lower significant bits, but the influences of the lower significant bits upon the picture data is not very significant and this problem does not result in visible distortion in practice.

Though CRCC has been used for horizontal row and vertical column parity bits, the invention is not particularly limited to CRCC, but can use other codes having similar ability. In conjunction with the burst error detection signal, it is possible to detect the level drop of the analog waveform shown in FIG. 2A and to use it as a pointer signal.

As described above, when used for correcting the error in a video signal, the present invention can improve random error correcting ability for the upper significant bits without increasing redundancy, and can efficiently correct picture data without reducing burst error correcting ability.

We claim:

1. A method of correcting a digital signal error when recording and reproducing a digital signal, including the steps:
    adding parity bits having a relatively high redundancy to the upper significant bits of a digital data signal and parity bits having a relatively small redundancy to the lower significant bits of the digital data signal, respectively;
    recording said upper and lower significant bits together with their parity bits on a recording medium;
    reproducing signals corresponding to the data bits and their parity bits from said recording medium, and dividing the reproduced signals into a group containing said upper significant bits and their parity bits and a group containing said lower significant bits and their parity bits;
    detecting the position of an error in said upper significant bit group on the basis of said parity bits of said upper significant bits, and correcting the error;
    estimating an area of occurrence of an error in said lower significant bit group on the basis of the position of the error detected in said upper significant bit group; and
    correcting the error in said lower significant bit group on the basis of the result of estimation and of said parity bits of said lower significant bits.

2. The method of correcting an error as defined in claim 1 wherein an area greater than the area of occurrence of the error detected in said upper significant bit group is estimated as an area of occurrence of error in said lower significant bit group.

3. The method of correcting an error as defined in claim 1 wherein said parity bits to be added to said upper and lower significant bits, respectively, are horizontal row parity bits and vertical column parity bits, respectively.

4. The method of correcting an error as defined in claim 3 wherein said horizontal row parity bits added to said upper significant bits are a code having a capability of correcting a 1-bit error and can detect errors exceeding 1-bit; said vertical column parity bits added to said upper significant bits are a code having a capability of correcting erasure; said horizontal row parity bits added to said lower significant bits are a code having a capability of detecting a 1-bit error; and said vertical column parity bits added to said lower significant bits are a code having a capability of correcting erasure.

5. The method of correcting an error as defined in claim 1 wherein said recording medium is a magnetic recording medium.

6. A system for correcting an error of a digital signal comprising:
    parity addition means for adding parity bits having a relatively high redundancy to upper significant bits of a data signal which is digitized, and parity bits having a relatively low redundancy to lower significant bits of said data signal;
    recording means for recording said data bits and their parity bits on a recording medium;
    reproduction means for reproducing signals corresponding to said data bits and to said parity bits from said recording medium;
    error detection and correction means for detecting the position of the error in an upper significant bit group on the basis of said parity bits of said reproduced upper significant bits, and correcting the error;
    designation means for generating data designating an area of occurrence of an error in a lower significant bit group on the basis of the position of error in said upper significant bit group detected by said error detection and correction means;
    correction means for correcting the error in said lower significant bit group on the basis of the data sent from said designation means and on the basis of the parity bits of said reproduced lower significant bits; and
    synthesis means for synthesizing said corrected upper significant bits and said corrected lower significant bits in order to generate a data signal.

7. A system for correcting an error of a digital signal comprising:

parity addition means for adding parity bits having a relatively high redundancy to the upper significant bits of a data signal which is digitized, and parity bits having a relatively low redundancy to lower significant bits of said data signal;

recording means for recording said data bits and their parity bits on a recording medium;

reproduction means for reproducing signals corresponding to said data bits and to said parity bits from said recording medium;

error detection and correction means for detecting the position of the error in an upper significant bit group on the basis of said parity bits of said reproduced upper significant bits, and correcting the error;

designation means for designating a data block, in which the error is detected by said error detection and correction means, and data blocks preceding and subsequent to said data block as an area of occurrence of error in said lower significant bit group;

correction means for correcting the error in said lower significant bit group on the basis of the data sent from said designation means and on the basis of the parity bits of said reproduced lower significant bits; and synthesis means for synthesizing said corrected upper significant bits and said corrected lower significant bits in order to generate a data signal.

8. A method of recording and reproducing a digital video signal including the steps:

adding parity bits having a relatively high redundancy to the upper significant bits of the digital video signal and parity bits having a relatively low redundancy to the lower significant bits of said video signal, respectively;

recording said upper and lower significant bits together with their parity bits on a recording medium;

reproducing signals corresponding to said video signal bits and their parity bits from said recording medium, and dividing the reproduced signals into a group containing said upper significant bits and their parity bits and a group containing said lower significant bits and their parity bits;

detecting the position of an error in said upper significant bit group on the basis of said parity bits of said upper significant bits, and correcting the error;

estimating an area of occurrence of error in said lower significant bit group on the basis of the position of the error detected in said upper significant bit group;

correcting the error in said lower significant bit group on the basis of the result of estimation and of said parity bits of said lower significant bits; and synthesizing said corrected upper significant bits and said corrected lower significant bits in order to form a video signal.

9. The method of recording and reproducing a digital video signal as defined in claim 8 wherein an area greater than the area of occurrence of the error detected in said upper significant bit group is estimated as an area of occurrence of the error in said lower significant bit group.

10. The method of recording and reproducing a digital video signal as defined in claim 8 wherein said recording medium is a magnetic recording medium.

11. A system for recording and reproducing a digital video signal comprising:

parity addition means for adding parity bits having a relatively high redundancy to upper significant bits of a digital video signal and parity bits having a relatively low redundancy to the lower significant bits of said video signal;

recording means for recording said video signal bits and their parity bits on a recording medium;

reproduction means for reproducing signals corresponding to said video signal bits and their parity bits from said recording medium;

error detection and correction means for detecting the position of the error in an upper significant bit group on the basis of said parity bits of said reproduced upper significant bits, and correcting the error;

designation means for generating data designating an area of occurrence of error in a lower significant bit group on the basis of the position of the error in said upper significant bit group detected by said error detection and correction means;

correction means for correcting the error in said lower significant bit group on the basis of the data sent from said designation means and on the basis of the parity bits of said reproduced lower significant bits; and synthesis means for synthesizing said corrected upper significant bits and said corrected lower significant bits in order to generate a video signal.

12. A system for recording and reproducing a digital video signal comprising:

parity addition means for adding parity bits having a relatively high redundancy to upper significant bits of a digital video signal and parity bits having relatively low redundancy to the lower significant bits of said video signal;

recording means for recording said video signal bits and their parity bits on a recording medium;

reproduction means for reproducing signals corresponding to said video signal bits and their parity bits from said recording medium;

error detection and correction means for detecting the position of the error in an upper significant bit group on the basis of said parity bits of said reproduced upper significant bits and correcting the error;

designation means for designating a data block, in which the error is detected by said error detection and correction means, and data blocks preceding and subsequent to said data block as an area of occurrence of error in said lower significant bit group;

correction means for correcting the error in said lower significant bit group on the basis of the data sent from said designation means and on the basis of the parity bits of said reproduced lower significant bits; and synthesis means for synthesizing said corrected upper significant bits and said corrected lower significant bits in order to generate a video signal.

* * * * *